US006446164B1

United States Patent
Nguyen et al.

(10) Patent No.: US 6,446,164 B1
(45) Date of Patent: *Sep. 3, 2002

(54) TEST MODE ACCESSING OF AN INTERNAL CACHE MEMORY

(75) Inventors: De H. Nguyen, Milpitas; Raymond M. Chu, Saratoga, both of CA (US)

(73) Assignee: Integrated Device Technology, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/818,060

(22) Filed: Mar. 14, 1997

Related U.S. Application Data

(63) Continuation of application No. 07/722,026, filed on Jun. 27, 1991, now abandoned.

(51) Int. Cl.$^7$ ............................................... G06F 12/00
(52) U.S. Cl. ..................... 711/118; 711/123; 711/125; 711/126; 714/30
(58) Field of Search ................................. 395/403, 448, 395/449, 450, 451, 453, 183.06; 711/3, 123, 125, 126, 118; 714/183.18

(56) References Cited

U.S. PATENT DOCUMENTS 3,867,579 A * 2/1975 Colton et al. ................ 370/509
4,071,889 A * 1/1978 Sumida et al. ............... 713/400

(List continued on next page.)

OTHER PUBLICATIONS

John Hennessy et al, "Computer Architecture A Quantitative Approach", Morgan Kaufmann Publishers, Inc., 1990; pp. 528–531.*

IBM Technical Disclosure Bulletin, vol. 27, No. 2, Jul. 1984, pp. 956–958.*

Mano, Computer Systems Architecture, 2nd ed., 1982, pp. 62–63, 217–284, and 403–473.*

Mano, Computer System Architecture, 2nd Ed., pp. 266–268, 1982.*

*Primary Examiner*—Reginald G. Bragdon
(74) *Attorney, Agent, or Firm*—Skjerven Morrill MacPherson LLP

(57) ABSTRACT

A circuit and method for reading and writing to a microprocessor's internal cache memory during a test mode of operation. During write accesses, an external data bus transmits to an internal data bus an address, cache tags and data in accordance with an external clock. During read accesses, the external data bus transmits an address and receives from the internal data bus data and cache tags. In one embodiment, during a write access, the external data bus is time-multiplexed to transmit an address, cache tags and data in two clock periods of the external clock the external data bus is time-multiplexed to transmit to the internal data bus an address in the first clock period of the external clock signal and to receive tag and data in the next successive clock periods of the external clock signal. In this embodiment, reserved pins are used to specify a cache access mode, including a test mode of operation. During the test mode, read and write buffers for the internal cache are deselected from the interal bus and the central processing unit of the microprocessor is stalled. Control for the cache access is provided via pins which are used during functional (non-test mode) operation to receive external interrupt signals.

15 Claims, 6 Drawing Sheets

U.S. PATENT DOCUMENTS

| | | | | |
|---|---|---|---|---|
| 4,257,095 A | * | 3/1981 | Nadir | 710/119 |
| 4,315,310 A | * | 2/1982 | Bayliss et al. | 710/3 |
| 4,365,294 A | * | 12/1982 | Stockken | 713/502 |
| 4,575,792 A | * | 3/1986 | Keeley | 711/126 |
| 4,591,975 A | * | 5/1986 | Wade et al. | 710/260 |
| 4,701,844 A | * | 10/1987 | Thompson et al. | 711/119 |
| 4,920,534 A | * | 4/1990 | Adelmann et al. | 370/474 |
| 4,922,438 A | * | 5/1990 | Ballweg | 370/465 |
| 4,933,835 A | * | 6/1990 | Sachs et al. | 711/123 |
| 4,933,846 A | * | 6/1990 | Humphrey et al. | 710/107 |
| 5,131,083 A | * | 7/1992 | Crawfold et al. | 710/29 |
| 5,165,029 A | * | 11/1992 | Sawai et al. | 711/3 |
| 5,185,878 A | * | 2/1993 | Baror et al. | 711/123 |
| 5,226,130 A | * | 7/1993 | Favor et al. | 712/238 |
| 5,249,281 A | * | 9/1993 | Fuccio et al. | 711/123 |
| 5,293,603 A | * | 3/1994 | Mac Williams et al. | 711/117 |
| 5,317,711 A | * | 5/1994 | Bourekas et al. | 714/47 |
| 5,317,718 A | * | 5/1994 | Jouppi | 711/137 |
| 5,479,630 A | * | 12/1995 | Killian | 711/3 |
| 5,542,062 A | * | 7/1996 | Taylor et al. | 711/3 |
| 5,553,262 A | * | 9/1996 | Ishida et al. | 711/123 |
| 5,623,626 A | * | 4/1997 | Morioka et al. | 711/118 |
| 5,636,363 A | * | 6/1997 | Bourekas et al. | 711/138 |
| 5,649,232 A | * | 7/1997 | Bourekas et al. | 710/60 |

* cited by examiner

TEST MODE ACCESSING OF AN INTERNAL CACHE MEMORY

This application is a continuation of application Ser. No. 07/722,026, filed Jun. 27, 1991, now abandoned.

FIELD OF THE INVENTION

This invention relates to integrated circuits, and in particular, relates to the design of microprocessors.

DESCRIPTION OF RELATED ART

Exploiting the property of locality of memory references, cache memories have been successfully used to achieve high performance in many computer systems. In the past, cache memories of microprocessor-based systems are provided off-chip using high performance memory components. This is primarily because the amount of silicon area necessary to provide an on-chip cache memory of reasonable performance would have been impractical, since increasing the size of an integrated circuit to accommodate a cache memory will adversely impact the yield of the integrated circuit in a given manufacturing process. However, with the density achieved recently in integrated circuit technology, it is now possible to provide on-chip cache memory economically.

In a computer system in which a cache memory is provided, when a memory word is needed, the central processing unit (CPU) looks into the cache memory system for a copy of the memory word. If the memory word is found in the cache memory, a cache "hit" is said to have occurred, and the main memory is not accessed. Thus, a figure of merit which can be used to measure the effectiveness of the cache memory is the "hit" ratio. The hit ratio is the percentage of total memory references in which the desired datum is found in the cache memory without accessing the main memory. When the desired datum is not found in the cache memory, a "cache miss" is said to have occurred. In addition, in many computer systems, there is one or more portions of the address space which is not mapped to the cache memory. This portion of the address space is said to be "uncached" or "uncacheable". For example, the addresses assigned to input/output (I/O) devices are almost always uncached. Both a cache miss or an uncacheable memory reference results in an access to the main memory.

In the course of developing or debugging a computer system, it is often necessary to monitor program execution by the CPU or to interrupt one instruction stream to direct the CPU to execute certain alternate instructions. For example, a technique for testing a microprocessor in a system under development uses an in-circuit emulator (ICE) which provides facilities to monitor and intervene in the CPU's instruction stream. The ICE typically monitors the signals on the microprocessor's pins. In one mode of ICE operation, when a predetermined condition in the program execution is encountered, the ICE causes alternative instructions to be executed for such purpose as reading or altering the internal states of the CPU. Such alternative instructions can be preloaded into the cache memory or excluded from the cache memory. The ability to load or exclude such instructions into or instructions from the cache memory from a source external to the CPU can be very useful in many applications. Such ability is not known in the prior art.

When the cache memory is implemented off-chip, the ICE can easily isolate the cache memory and perform diagnostic test on each cell in the cache memory by using such techniques as exhaustive standard memory test algorithms independent from the operation of the CPU. In addition, the transactions between the cache memory and the CPU can be monitored by the ICE on the off-chip bus between the cache memory and the CPU. Hence, no difficulty is created in testing or using an off-chip cache. However, when the cache memory is implemented on-chip, the transactions between the cache and the CPU occur on an on-chip bus, which cannot be probed from the pins of the integrated circuit. As a result, debugging operations using an ICE in a system with an on-chip cache system can be very restricted. The inability to access and exhaustively test the internal cache makes diagnosing certain system problems difficult. When the on-chip cache achieves a high hit ratio, only the relatively infrequent accesses to main memory due to cache misses or references to uncacheable parts of memory can be monitored from the pins.

SUMMARY OF THE INVENTION

In accordance with the present invention, a structure and a method provide read and write accesses to a microprocessor's internal cache. During write access, an external data bus transmits to an internal data bus an address, cache tags and data in accordance with a clock signal provided externally. During read access, the external data bus transmits an address and receives from the internal data bus data and tag, also in accordance with the clock, signal provided externally.

In one embodiment, during write access, the external data bus is time-multiplexed to transmit the address, the cache tags and data in two clock periods of an externally provided clock signal. In the same embodiment, during read access, the external data bus is time-multiplexed to transmit to the internal data bus an address in the first clock period of the external clock signal, and to receive cache tags and data in the next two successive clock periods of the externally provided clock signal. In this embodiment, "reserved" pins are used to specify a cache access mode. Control signals for the cache access are provided via pins which are used during functional operation to receive external interrupt signals.

The present invention allows the user of the microprocessor to exhaustively test the on-chip cache using standard memory test algorithms. The present invention also allows preloading the on-chip cache under control of signals external to the microprocessor. Such preloading operations can be useful in certain applications. In addition, the present invention provides a facility for external testing equipment to monitor or intervene internal operations of the microprocessor.

The present invention is better understood upon consideration of the below detailed description and the accompanying drawings.

BRIEF DESCRIPTION OF THE DRAWINGS

FIG. 1b is a block diagram of the processor 101 of FIG. 1a.

DETAILED DESCRIPTION

Figure 1A:
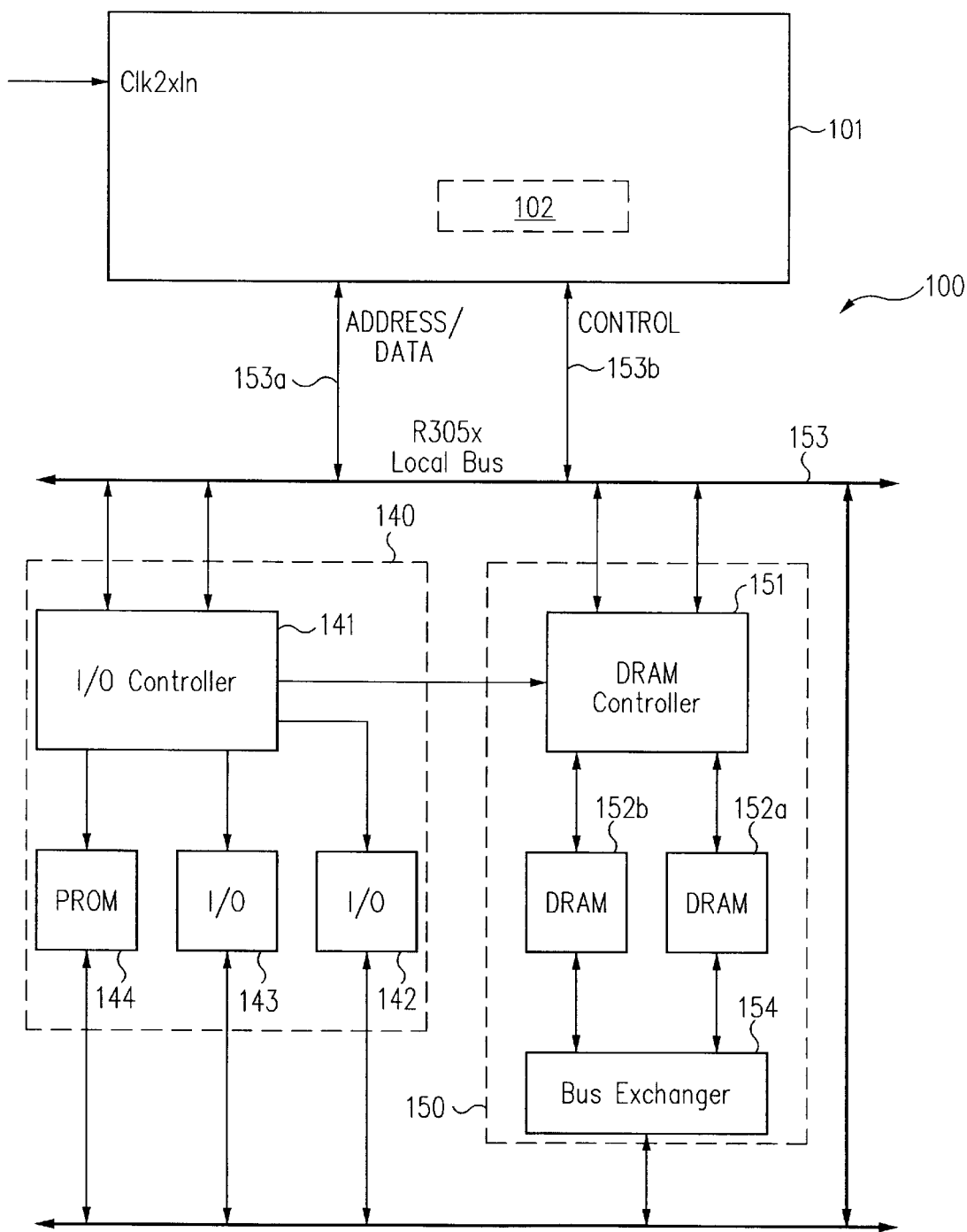
FIG. 1a shows a computer system 100 having a processor 101 with an on-chip instruction cache system 102 and a main memory system 150 external to the processor 101, in accordance with the present invention.

FIG. 1a shows, as an example, a computer system 100 having a processor 101 with an on-chip cache system 102 and a main memory system 150 external to the processor, in accordance with the present invention. As shown in FIG. 1a, external or read and write memory ("main memory") system 150, which is interfaced to the processor 101 over a bus 153, comprises a dynamic random access memory (DRAM) controller 151, a main memory 152 implemented by banks 152a and 152b of DRAMs and a bus interface 154. In addition, the address space of computer system 100 is also used to access other memory-mapped devices such as I/O controller 141, I/O devices 142 and 143, and programmable read-only memory (PROM) 144. To facilitate reference, the memory-mapped devices other than the main memory 150 defined above are collectively referred to as the I/O system 140, even though read-only memories, such as PROM 144, are often not considered part of the I/O system. I/O system 140 is also interfaced to the bus 153. Bus 153 comprises address/data bus 153a and control bus 153b. Memory data and memory addresses are time-multiplexed on the 32-bit address/data bus 153a. Other device configurations using the memory address space are also possible within the scope of the present invention.

Figure 1B:
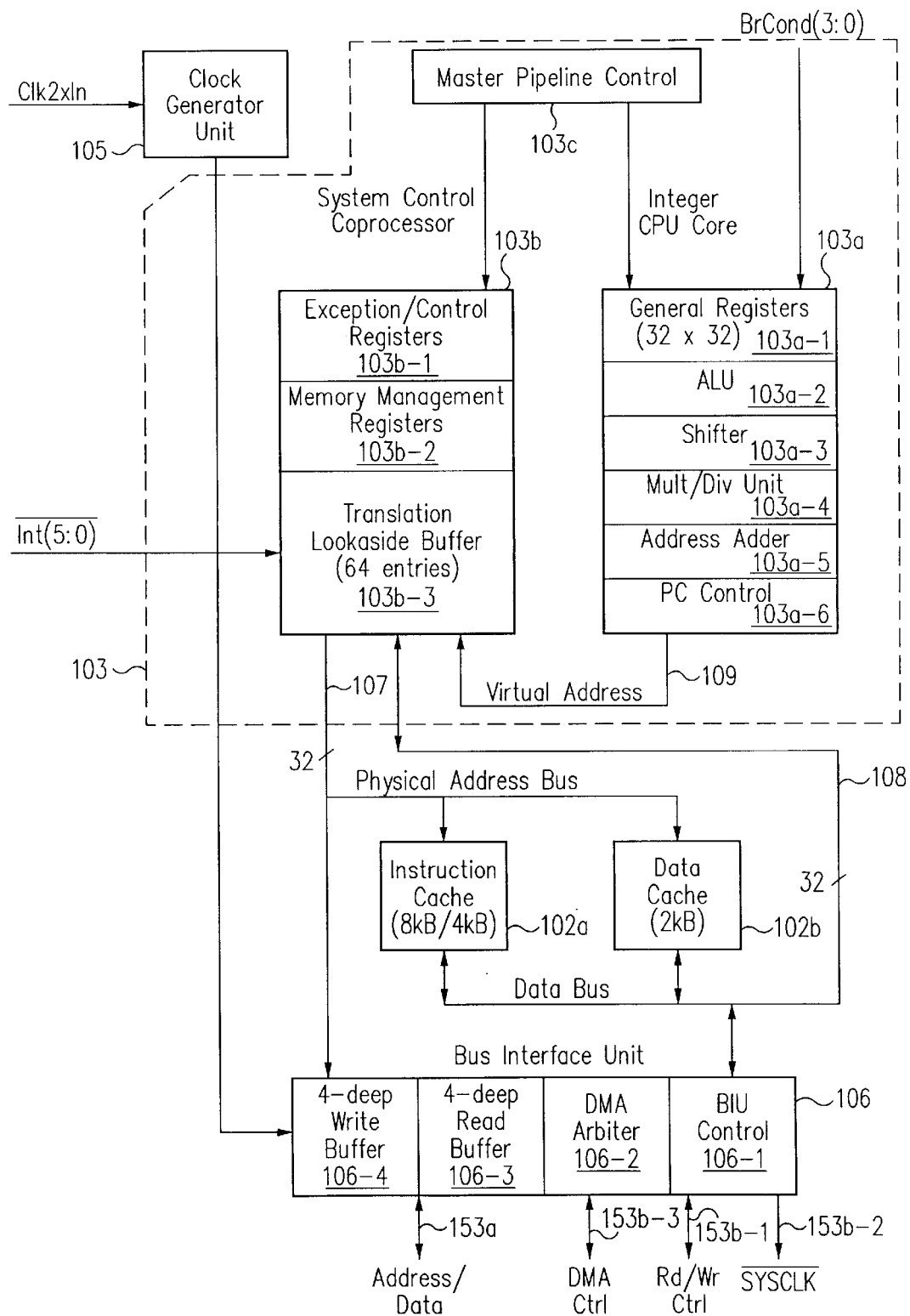

The organization of processor 101 is shown in FIG. 1b. As shown in FIG. 1b, processor 101 includes two co-processors 103a and 103b, controlled by a master pipeline control unit 103c. Coprocessor 103a is also referred to as the integer CPU, and includes 32 32-bit general registers 103a-1, an ALU 103a-2, a shifter 103a-3, a multiplication and division unit 103a-4, an address adder 103a-5, and program counter control unit 103a-6. Processor 103a executes the instruction set known as the MIPS-I Instruction Set Architecture (ISA). Coprocessor 103b, also known as the System Control Coprocessor, comprises exception/control registers 103b-1, a memory management registers unit 103b-2 and a translation look-aside buffer (TLB) 103b-3. The TLB unit 103b-3 provides a mapping between virtual and physical addresses. The TLB unit 103b-3 has a 64-entry look-up table to provide mapping between virtual and physical addresses efficiently. In this embodiment, the TLB unit 103b-3 is provided at the user's option. The TLB unit 103b-3 can be disabled. The above units of the coprocessors 103a and 103b can be implemented by conventional or any suitable designs known in the art. The coprocessor units 103a and 103b, and the pipeline control unit 103c are collectively referred to as the CPU core 103.

The cache system 102 of processor 101 comprises two cache memories 102a and 102b. Cache 102a is an instruction cache. In this embodiment shown, the capacity of cache 102a can be 4K or 8K bytes, and block fill and line sizes of four memory words each. Cache 102b is a data cache, and has a selectable block refill size of one or four memory words, a line size of one memory word, and a capacity of 2K bytes. Other cache, block refill and line sizes can be provided within the scope of the present invention. Both the capacities of cache 102a and cache 102b, and their respective block refill and line sizes, are matters of design choice. In addition, it is also not necessary to provide separate data and instruction caches. A joint data and instruction cache is also within the scope of the present invention. The TLB unit 103b-3 receives from the CPU core 103 on bus 109 a virtual address and provides to either cache 102a or cache 102b on bus 107 the corresponding physical memory address. Although cache accessing using virtual addresses is also possible, by using physical addressing in the instruction and data caches, the present embodiment simplifies software requirements and avoids the cache flushing operations necessary during a context switch in a virtually addressed cache. The cache addressing scheme of the present embodiment is discussed below in conjunction with FIG. 2. Other cache addressing schemes are also possible within the scope of the present invention.

Bus interface unit (BIU) 106 interfaces processor 101 with the main memory 150 when a read or write access to main memory is required. BIU 106 comprises a 4-deep write buffer 106-4, a 4-deep read buffer 106-3, a DMA arbiter 106-2 and BIU control unit 106-1. BIU control unit 106-1 provides all control signals on bus 153b, which comprises buses 153b-1 to 153b-3 necessary to interface with the main memory 150 and the I/O system 140. Both addresses and data are multiplexed on the address/data bus 153a, and the control signals are provided on the $\overline{\text{Rd/Wr}}$ control bus 153b-1, the system clock signal 153b-2, and the DMA control bus 153b-3.

Figure 2:
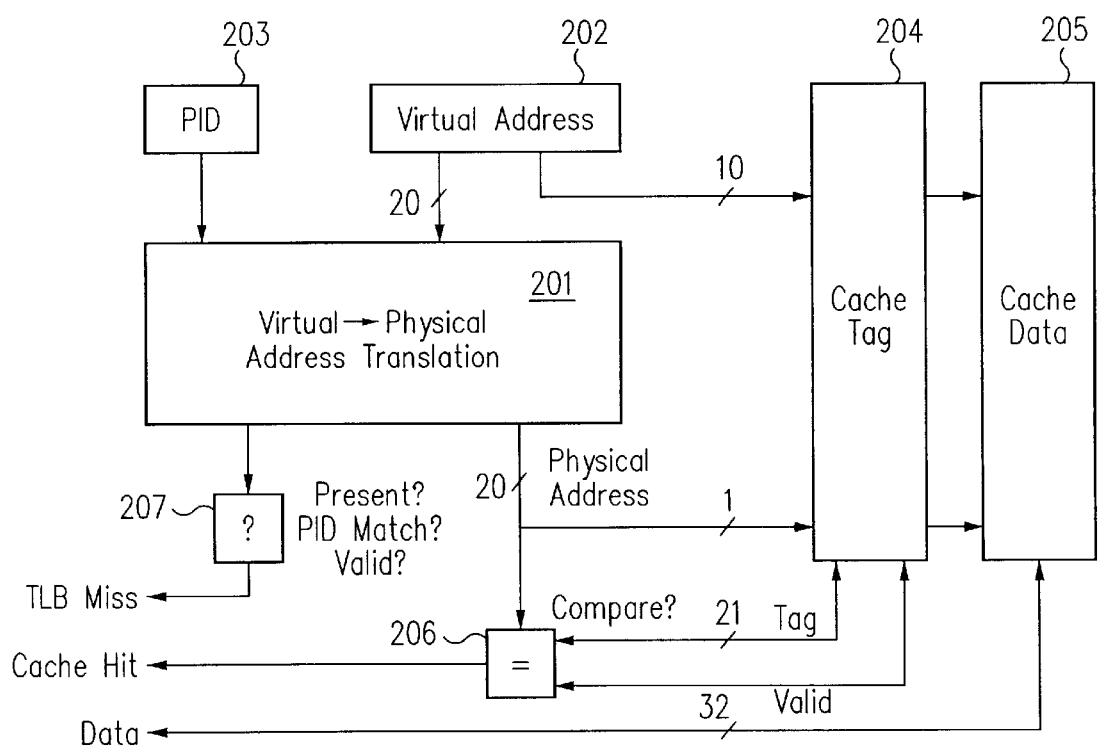
FIG. 2 is a block diagram showing the addressing scheme used in instruction cache 102a of the cache system 102 of FIGS. 1a and 1b.

FIG. 2 is a block diagram showing the addressing scheme used in the instruction cache 102a of the cache system 102, which is shown in FIGS. 1a and 1b. As shown in FIG. 2, the higher order 20 bits of a virtual address (generated by CPU core 103, as shown in FIG. 1b), which is represented by block 202, is provided to the cache addressing mechanism represented by block 201. The remaining 10 bits of the memory word address are common between the virtual and the physical addresses. (The lowest two address bits are byte addresses, which are not used in cache addressing.) These common bits are directly provided to index into the cache memory 102a, represented by blocks 204 and 205. Block 205 represents the data portion of the cache line, which comprises four 32-bit memory words in this embodiment. Block 204 represents the "tag" portion (TAG[32:11]) of the cache data word; this tag portion contains both a "valid" TAGV bit and the higher order 20 bits of the memory word addresses of the data words stored in the cache line. (Since the addresses of memory words within the cache line are contiguous, the higher order 20 bits are common to all of the memory words in the cache line). The valid bit TAGV indicates that the cache word contains valid data. Invalid data may exist if the data in the cache does not contain a current memory word. This condition may arise, for example, after a reset period.

Each virtual address is associated with a particular process identified by a unique "process id" PID, which is represented by block 203. Block 201 represents the virtual address to the physical address translation, which is performed using the TLB unit 103b-3 when the TLB is present. (FIG. 1b.) When the TLB is present, a TLB miss occurs if either a mapping between the virtual address and the corresponding physical address cannot be found in the 64 entries of the TLB unit 103b-3, the PID stored in the TLB unit 103b-3 does not match the PID of the virtual address, or if the valid bit in the data word is not set. Block 207 represents the determination of whether a TLB miss has occurred. The TLB miss condition raises an exception condition, which is handled by CPU core 103. If a virtual address to physical address mapping is found, the higher order 20 bits of the physical memory word address is compared (block 206) with the memory address portion of the tag. The valid bit is examined to ensure the data portion of the cache line contains valid data. If the comparison (block 206) indicates a cache hit, the selected 32-bit word in the cache line is the desired data.

If a cache miss is indicated, BIU 106 is invoked and CPU core 103 stalls until BIU 106 indicates that the requested data is available. A cache miss can also be generated when the memory access is to a "uncacheable" portion of memory. When BIU 106 receives a datum from main memory, the CPU core 103 executes either a "refill", a "fix-up", or a "stream" cycle. In a refill cycle, an instruction datum received (in the read buffer 106-3) is brought into the cache 102a. In a fix-up cycle, the CPU core 103 transitions from a refill cycle to execute the instruction brought out of the read buffer 106-3. In a stream cycle, the CPU core 103 simultaneously refills cache memory 102a and executes the instruction brought out of the read buffer 106-3. For uncacheable references, the CPU core 103 executes a fixup cycle to bring out the fetched memory word from the read buffer 106-3, but the uncacheable memory word is not brought into the cache memory 102a. Otherwise, the CPU core 103 executes refill cycles until the miss address is reached. At that time, a fixup cycle is executed. Subsequent cycles are stream cycles until the end of the 4-memory word block is reached and normal run operation resumes. If sequential execution is interrupted, e.g. a successful branch condition, refill cycles are executed to refill the cache before execution is resumed at the branch address.

The operation of the data cache 102b is similar to that of instruction cache 102a, except that only one fixup cycle is used after one or four refill cycles, depending upon the refill block size selected. Because the size of the data caches is 2K bytes, a 21-bit "tag" is required. Hence, because of the different sizes of the instruction and data caches, the data cache's tag is 1 bit longer than the instruction cache's tag. In order to have the data and instruction caches share a common cache addressing scheme, the instruction cache routes one of its lower order address bits back as a tag bit, so as to appear as if the tag portion of the instruction cache is 21-bit. If the refill block size selected for the data cache is four memory words, as will be apparent below, the present invention provides the same benefit in the data cache as in the instruction cache.

Figure 3:
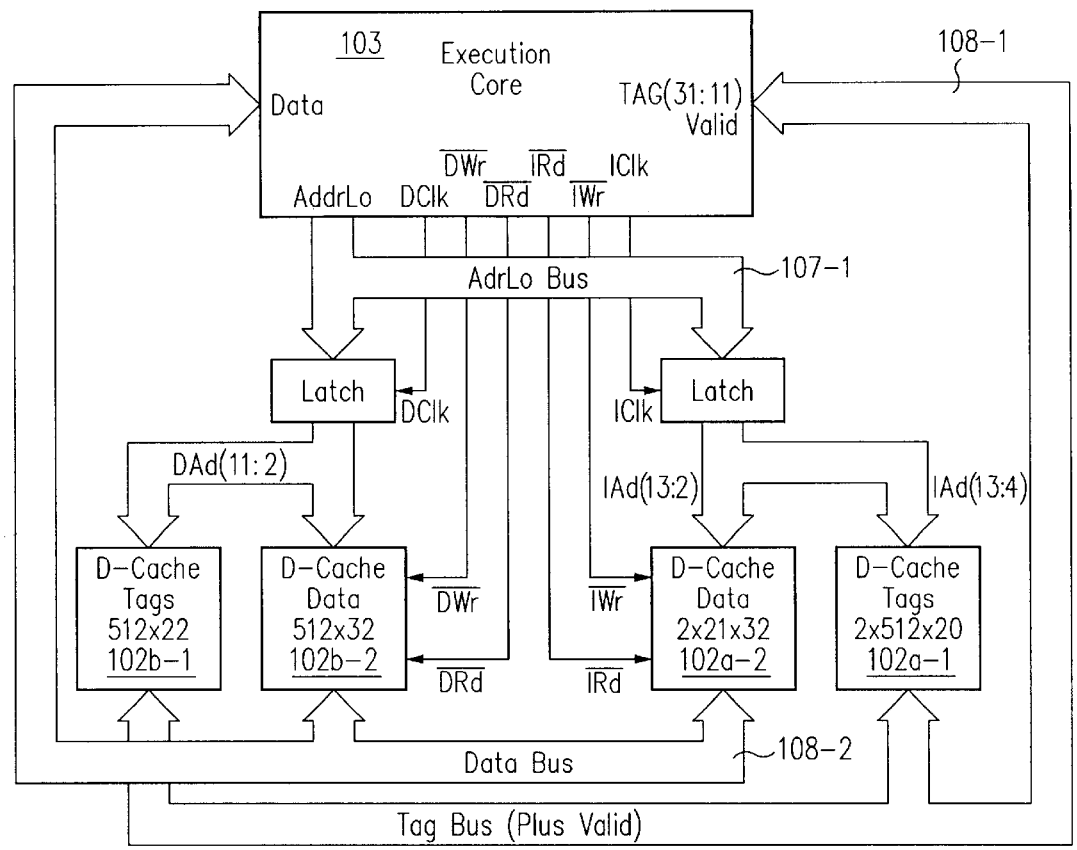
FIG. 3 is a block diagram in further detail than FIG. 2 of the interface between CPU core 103 and the instruction and data caches 102a and 102b, including the control signals ICLK, DCLK, $\overline{\text{IWR}}$, $\overline{\text{DWR}}$, $\overline{\text{IRD}}$ and $\overline{\text{DRD}}$.

FIG. 3 is a more detailed block diagram of the interface between CPU core 103 and the instruction cache memory 102a and the data cache memory 102b. As shown in FIG. 3, CPU core 103 provides the lower order bits of the physical cache addresses on bus 107-1 (ADRLO[12:0]) to address either of the cache memories 102a and 102b, and receives the tag and data contents of the cache memory addressed respectively on 22-bit bus 108-1 (TAG[31:11] and TAGV, hereinafter "TAG BUS") and 32-bit bus 108-2 ("DATA [31:0]"). CPU core 103 provides to instruction cache 102a the clock signal ICLK, the read signal $\overline{\text{IRd}}$, and the write signal $\overline{\text{IWr}}$ for reading and writing cache 102a. An analogous set of signals DCLK, $\overline{\text{DRd}}$ and $\overline{\text{DWr}}$ are provided to the data cache memory 102b. Instruction cache 102a is divided into two banks 102a-1 and 102a-2. In bank 102a-1 is stored the tags of the cache entries, and the data words are stored in bank 102a-2. Since instruction cache 102a has a line size of four, there are four times as many entries in the data bank 102a-2 as tag bank 102a-1. Data cache 102b is similarly divided into tag and cache banks 102b-1 and 102b-2 respectively.

Processor 101 is a microprocessor of 84 pins. Other than the power and ground signals, processor 101 receives or provides: a 32-bit address or data bus ADBUS[31:0], lower address bus ADR[3:2], address latch enable signal ALE, data input enable signal $\overline{\text{DataEn}}$, burst transfer or write near signal $\overline{\text{Burst/WrNear}}$, read signal $\overline{\text{Rd}}$, write signal $\overline{\text{Wr}}$, acknowledge signal $\overline{\text{ACK}}$, read buffer clock enable signal $\overline{\text{RdCEn}}$, bus error signal $\overline{\text{BusError}}$, diagnostic signals Diag[1:0], DMA bus request signal $\overline{\text{BusReq}}$, DMA bus grant signal $\overline{\text{BusGnt}}$, branch condition port BrCond[3:0], interrupt signals $\overline{\text{Int}[5:0]}$, clock signals Clk2xIn and $\overline{\text{SysClk}}$, reset signal $\overline{\text{Reset}}$, and reserved signals RSVD[4:0]. The functional descriptions of these signals can be found in the "IDT79R3051 Family Hardware User's Manual," available from Integrated Device Technology, Inc., Santa Clara, Calif. This hardware manual is hereby incorporated by reference in its entirety.

In order to provide the benefits of the present invention, the pins receiving reserved signals RSVD[4:0] (i.e. the "reserved pins RSVD[4:0]") are used to place processor 101 into the "cache memory access" mode. This is accomplished when bit pattern '011' is detected on the reserved pins RSVD[4:2]. Reserved pins RSVD[4:0] are provided for general testing purpose, such as testing the cache memories 102a and 102b as provided by the present invention. To avoid accidentally placing processor 101 into the a testing mode, reserved pins RSVD[4:0] are each provided with a weak pull-down device. Consequently, since the user of processor 101 will normally leave reserved pins RSVD[4:0] floating, each of the reserved pins RSVD[4:0] will settle at ground voltage.

When cache memory access mode is entered, the CPU core 103 stalls to yield control of the data busses DATA[31:0] (108-2), ADRLO[12:0] (107-1), TAG BUS (108-1) and the leads for the cache control signals ICLK, DCLK, $\overline{\text{IWr}}$, $\overline{\text{IRd}}$, $\overline{\text{DWr}}$ and $\overline{\text{DRd}}$ to the external testing device desiring to access the cache memory. Because processor 101 stalls in cache memory access mode, the signals on tag and data buses TAG BUS (108-1) and DATA[31:0] and the control signals ICLK, DCLK, $\overline{\text{IRd}}$, $\overline{\text{DRd}}$, $\overline{\text{IWr}}$ and $\overline{\text{DWr}}$ are provided externally. In the cache memory access mode, the pins ("$\overline{\text{INT}[5:0]}$ pins") normally receiving interrupt signals $\overline{\text{INT}[5:0]}$, and the reserved pin RSVD[1] are used to provide these control signals from the external testing device. Specifically, the $\overline{\text{INT}[0]}$ pin provides a clock signal CA_CLK, the $\overline{\text{INT}[1]}$ pin provides a read signal $\overline{\text{CA\_Rd}}$, and the $\overline{\text{INT}[2]}$ pin provides a write signal $\overline{\text{CA\_Wr}}$. In addition, the signal ("I/D") or reserved pin RSVD[1] indicates whether the signals on the $\overline{\text{INT}[2:0]}$ pins are directed to data cache 102b (RSVD[1] at logic low) or the instruction cache 102a (RSVD[1] at logic high). Using the signals on these pins, the control signals ICLK, DCLK, $\overline{\text{IRd}}$, $\overline{\text{DRd}}$, $\overline{\text{IWr}}$, and $\overline{\text{DWr}}$ are generated internally. Under cache memory access mode, because the combined width of the TAG, ADRLO, and DATA busses are 67 bits, and when added to the number of the control signals, exceeds the total number of functional pins (i.e. other than power and ground pins) available, the pins ADBUS[31:0] and ADR[3:2], which are to be used for reading or writing the cache memories 102a and 102b must be time-multiplexed. Specifically, data flowing to and from the data bus DATA[31:0](108-2), and the data flowing to and from the TAG BUS (108-1) must occur at different phases of the CA_CLK. During a read cycle (see below) the tag and data phases of the clock are indicated by the logic state of the signal ("T/$\overline{D}$") on the $\overline{INT[5]}$ pin. Consequently, the following pin assignments are made:

| FUNCTIONAL MODE | CACHE MEMORY ACCESS MODE |
|---|---|
| $\overline{INT[0]}$ | CA_CLK |
| $\overline{INT[1]}$ | $\overline{CA\_Rd}$ |
| $\overline{INT[2]}$ | $\overline{CA\_Wr}$ |
| $\overline{INT[5]}$ | T/$\overline{D}$ |
| RSVD [1] | I/$\overline{D}$ |
| ADBUS [31:11] | TAG [31:11], DATA [31:11] |
| ADBUS [10:4] | ADRLO [10:4], DATA [10:4] |
| ADBUS [3:2] | ADRLO [12:11], DATA [3:2] |
| ADBUS [0] | TAGV |
| ADR [3:2] | ADRLO [3:2] |

Figure 4:
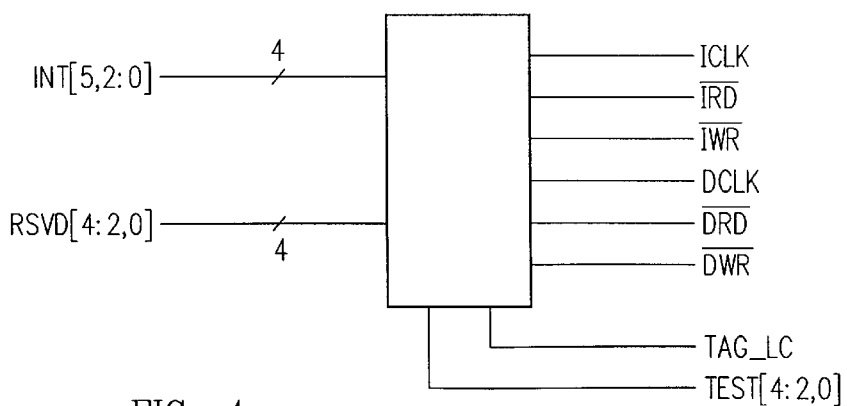
FIG. 4 summarizes some control signals generated from signals received on the microprocessor's pins for controlling reading and writing the instruction and data caches 102a and 102b, in accordance with the present invention.

In order to provide time-multiplexing of ADBUS[31:0], control signals must be generated according to (i) whether a read cycle or a write cycle is desired, (ii) whether data is to flow between the ADBUS[31:0] and which one of the TAG BUS 108-1, the ADRLO[12:0] bus 107-1, and the DATA [31:0] bus 108-2. A set of control signals TEST[4:2, 0] are generated accordingly. Some control signals generated from the values of the control pins discussed above for accomplishing the present invention are summarized in FIG. 4.

Figure 5:
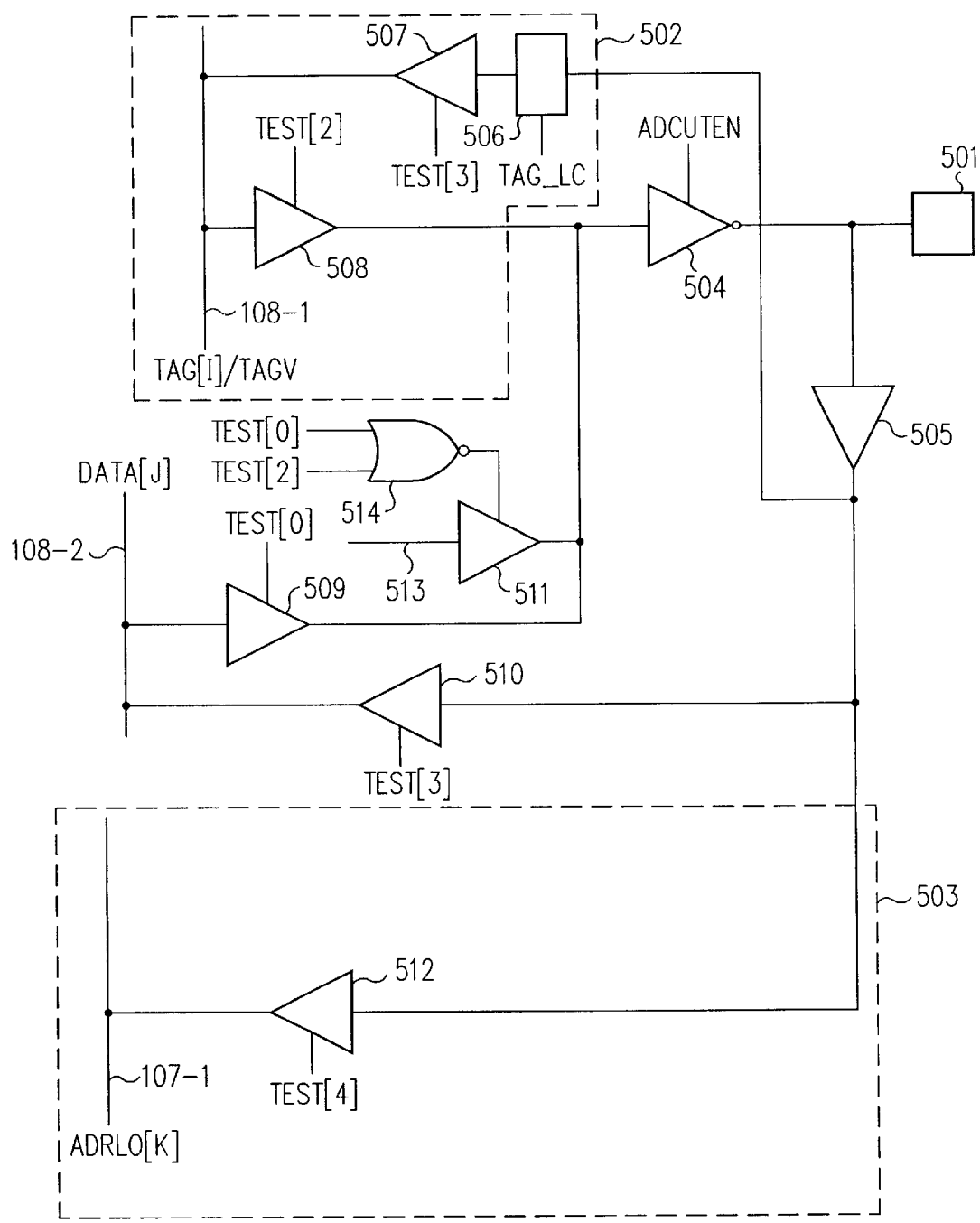
FIG. 5 shows data flow between one pin of processor 101 to one bit each in the DATA[31:0] bus and one of ADRLO [12:0] and TAG[31:11] busses, in accordance with the present invention.

As shown above, each bit on an external pin (any pin on the ADBUS[31:0] bus or the ADR[3:2] bus) is time-multiplexed between a bit on the DATA[31:0] bus 108-2 and a bit from either the TAG BUS 108-1 or the ADRLO[12:0] bus 107-1. The present invention provides datapaths between an ADBUS bit and its corresponding DATA (108-2) bit and ADRLO (107-1) or TAG BUS (108-1) bit in the manner provided in FIG. 5. As shown in FIG. 5, an external pin 501 is provided with both receiving (i.e. input) and driving (i.e. output) abilities by input buffer 505 and output buffer 504 respectively. When inputting, the output buffer 504 is disabled by control signal ADOUTEN (ADBUS output enable). The input buffer 505 is always enabled. During functional operations, pin 501 is multiplexed between the read buffer 106-3 (FIG. 1b) and the write buffer 106-4. An output signal from write buffer 106-4, for example, is provided on lead 513 for output to pin 501 through tristate buffers 511 and 504. Tristate buffer 511 is controlled by NOR gate 512, which receives as input signals the control signals TEST[0] and TEST[2]. During cache access mode, however, the write buffer 106-4 and the read buffer 106-3 are deselected by placing tristate buffer 511 in the high impedance state.

Depending on whether pin 501 is associated with a TAG BUS (108-1) bit or an ADRLO (107-1) bit, only one of the circuits enclosed in the boxes 502 and 503 is present at any pin. Thus, FIG. 5 is a generalized data path description of one external pin. For example, ADBUS[11], which is multiplexed between DATA[11] and TAG[11] does not have the circuit enclosed in box 503. Alternative, ADBUS[4], which is multiplexed between DATA[4] and ADRLO[4] does not have the circuit enclosed in box 502.

As shown in FIG. 5, the signal received by input buffer 505 is provided to the tristate buffer 510 and to either the latch 506 or the tristate buffer 512 depending on whether pin 501 is associated with the TAG BUS (108-1) or the ADRLO [12:0] bus (107-1). Latch 506 is clocked by a signal TAG_LC, which is a derivative of the clock signal CA_CLK driven from the $\overline{INT[0]}$ pin, to latch a tag bit from pin 501. Tristate buffer 507 is controlled by the control signal TEST [3] for driving the TAG BUS 108-1 at the predetermined phase of the CA_CLK. In the circuit enclosed in box 503, a similar tristate buffer 512 is controlled by the control signal TEST[4] to drive the ADRLO[12:0] bus (107-1). When outputting a TAG BUS (108-1) bit, the control signal TEST [2] activates on tristate buffer 508.

To output a bit from DATA bus 108-2, tristate buffer 509, which is controlled by control signal TEST[0], is activated. Conversely, to input a bit from pin 501, tristate buffer 510, which is controlled by control signal TEST[3], is activated.

Figure 6:
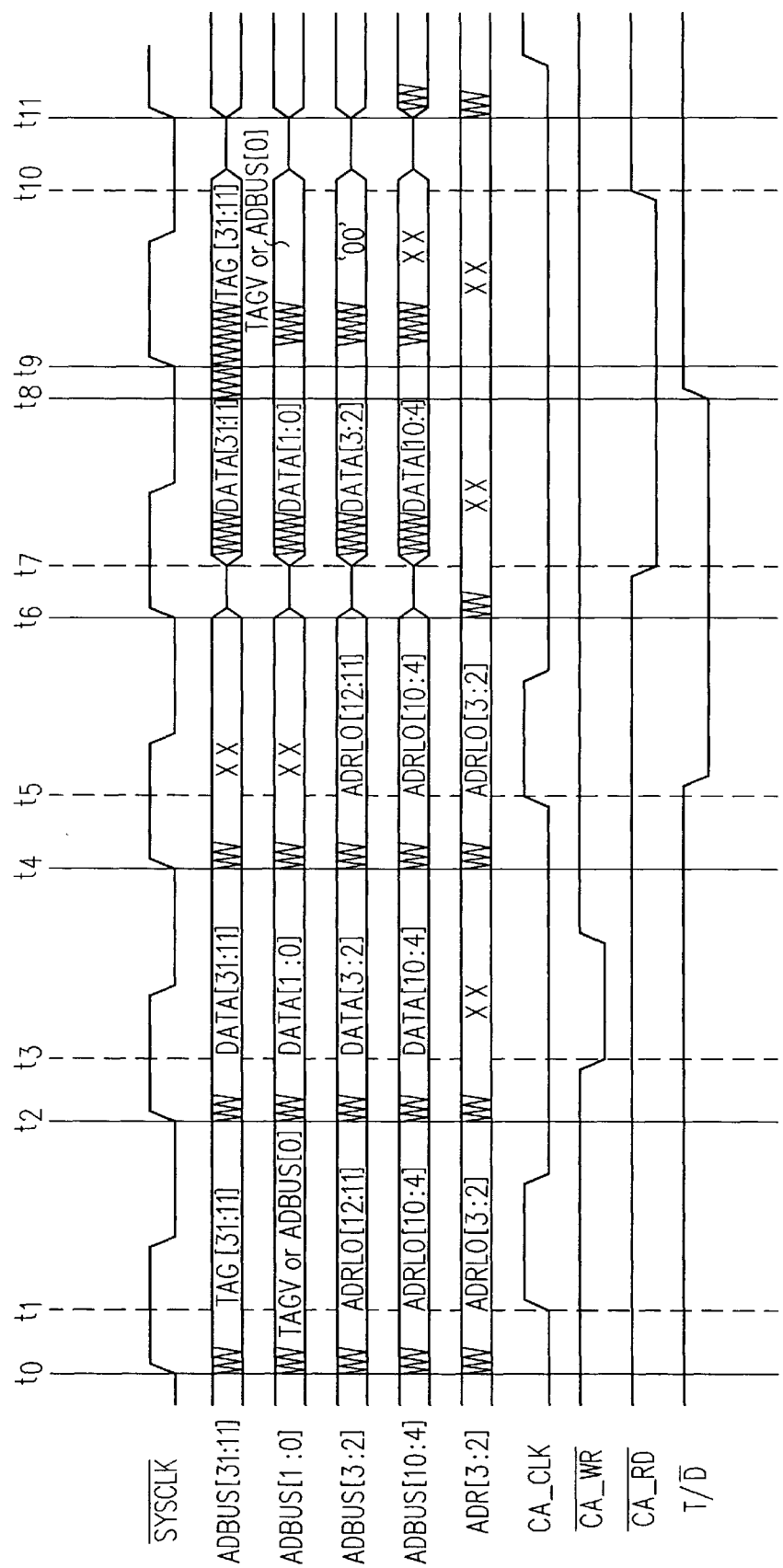
FIG. 6 shows a timing diagram for a read cycle and a write cycle involving either the instruction cache memory 102a, or the data cache memory 102b, in accordance with the present invention.

FIG. 6 is a timing diagram showing a write cycle and a read cycle for either the instruction cache memory 102a or the data cache memory 102b, depending on whether the I/$\overline{D}$ signal on the RSVD[1] bus is at logic high (instruction cache), or at logic low (data cache). As mentioned above, in the cache memory access mode, the output signals of the read buffer 106-3 and write buffer 106-4 are deselected from their functional operation output pins ADBUS[31:0].

As shown in FIG. 6, the write cycle, which is two $\overline{SysClk}$ periods long, is initiated at time t0. The cache address ADR[12:2], in the order specified, is placed on the ADBUS [3:2, 10:4] and the ADR[3:2] pins. At the same time, the tag data to be written TAG[31:11] and TAGV are placed on the ADBUS[31:11] and the ADBUS[0] pins. The CA_CLK signal on the $\overline{INT[0]}$ pin latches the ADRLO[12:2] data in the address latches of the cache memory specified by the signal I/$\overline{D}$ on the RSVD[1] pin. At the same time, the tag data TAG[31:11] and the TAGV bit are latched into latches provided, such as latch 506. The control signal Test[4] is activated to drive the input signals on the ADBUS[3:2], the ADBUS[10:4] and the ADR[3:2] pins onto the target ADRLO bus. At the next $\overline{SysClk}$ cycle, i.e. after time t2, the data to be written DATA[31:0] are placed on the ADBUS [31:0] pins. At time t3, the $\overline{CA\_WR}$ signal on the $\overline{INT[1]}$ pin is asserted and both the tag data TAG[31:11] previously latched, and the data DATA[31:0] on the ADBUS[31:0] are written into the location specified by ADRLO[12:2] in the selected cache memory. The control signal TEST[3] is activated to drive the signals on ADBUS[31:0] and the tag data previously latched onto the respective targets, i.e. the DATA[31:0] bus (108-2) and the TAG BUS (108-1).

At time t4, a read cycle is initiated. The address ADRLO [12:2] of the location in the cache memory selected by the I/$\overline{D}$ signal on RSVD[1] is placed on the assigned ADBUS [3:2, 10:4] and ADR[3:2] pins. At time t5, this address is latched into the address latches of the selected cache memory, the control signal TEST[4] having driven this address onto the ADRLO[12:0] bus. At the same time, the T/$\overline{D}$ signal on the $\overline{INT[5]}$ pin goes to logic low to select DATA[31:10] bus (108-2) for output in the next $\overline{SysClk}$ cycle, i.e. after time t6. At time t7, $\overline{CA\_Rd}$ signal is asserted to cause the selected cache memory to place the tag and data bits respectively onto the TAG BUS (108-1) and the DATA [31:0] bus (108-2), and the control signal ADOUTEN enables the ADBUS[31:0] pins for output. Control signal TEST[0] is also asserted to activate tristate buffer 509, so as to allow the data on DATA[31:0] bus (108-2) to be output on the ADBUS[31:0] pins. At time t8, the signal T/$\overline{D}$ on pin INT[5] goes to logic high, activating control signal TEST[2] and deactivating control signal TEST[0], so that the tag data on TAG BUS 108-1 (TAG[31:11] and TAGV bit) can be output on the ADBUS[31:11] and ADBUS[0]. The read cycle completes at time t10, when the read signal $\overline{CA\_Rd}$ is negated.

Using these read and write cycles, every location in each of the instruction cache memory 102a and the data cache memory 102b can be accessed. Standard exhaustive memory testing algorithms can be applied to each of the instruction and data cache memories 102a and 102b. In addition, the present invention allows testing processor 101 using methods requiring preloading the cache memories with data and instructions. Further, during testing by an in-circuit emulator, the contents of the cache memory can be examined and monitored.

The above detailed description is provided to illustrate the specific embodiments provided above, and not intended to be limiting the present invention. Many modifications and variations within the scope of the present invention are possible. The present invention is defined by the following Claims.

We claim:

1. A test circuit in an integrated circuit for reading and writing an internal cache memory of said integrated circuit, said integrated circuit including a central processing unit and being coupled to an external memory and an external bus, said external bus having a portion that is shared by address signals and data signals over a bus cycle of two or more clock periods, said test circuit comprising:

an internal bus within said integrated circuit interfaced to said internal cache memory;

a plurality of terminals, coupled to said external bus, said terminals receiving into said integrated circuit (i) said address signals from said external bus, said address signals specifying a location in said internal cache memory, (ii) a logic signal indicating whether said location is accessed for a read operation or a write operation (iii) a clock signal for synchronizing said read operation or said write operation; and (iv) a command indicating a cache memory test mode operation;

a read buffer and a write buffer provided for storing data received from said external memory and data to be stored into said external memory, respectively, said read buffer and said write buffer being coupled to said internal bus and said plurality of terminals during a functional operation not under said test mode; and a control circuit, coupled to said external bus and receiving said address signals and said command, said control circuit, during said test mode of operation, stalling said central processing unit, decoupling said read buffer and said write buffer from said internal bus and said plurality of terminals, accessing said internal cache memory in accordance with said address signals, and (i) during said read operation, (a) reading stored data of said location, (b) providing on said internal bus said stored data, and (c) transferring said stored data to said external bus; and (ii) during said write operation, (a) transferring input data from said external bus to said internal bus, and (b) writing said input data from said internal bus into said location.

2. The test circuit in claim 1, wherein each of said plurality of terminals is associated with a tristate buffer to allow bidirectional transfer operations between said internal bus and said external bus.

3. The test circuit as in claim 1, wherein said stored data and said input data each include a tag portion and a data portion.

4. The test circuit as in claim 1, wherein said internal cache memory comprises an instruction cache and a data cache.

5. The test circuit as in claim 1, further comprising additional terminals forming a control field, wherein when a predetermined bit pattern is received at said additional terminals, a test mode is indicated in which said read operation and said write operation are enabled.

6. The test circuit as in claim 1, wherein said internal cache memory has a line size exceeding the width of said external bus, said control circuit time-multiplexes said external bus during data transfers between said external bus and said internal bus.

7. The test circuit as in claim 1, wherein each location in said internal cache memory is specified by a predetermined bit pattern of said address signals.

8. A method for writing an internal cache memory of an integrated circuit during a test mode, said integrated circuit including a central processing unit and coupled to an external memory and an external bus, said external bus having a portion that is shared by data signals and address signals over a bus cycle of two or more clock periods, said memory comprising the steps of:

providing within said integrated circuit an internal bus interfaced to said internal cache memory;

providing within said integrated circuit a read buffer and a write buffer for storing data received from said external memory and data to be stored into said external memory, respectively, said read buffer and said write buffer being coupled to said internal bus and said plurality of terminals during a functional operation not under said test mode; and in response to receiving a command indicating said test mode, (a) stalling said central processing unit and decoupling said read buffer and said write buffer from said internal bus and said plurality of terminals;

(b) receiving into said integrated circuit, from said external bus, a logic signal indicating a write access to said internal cache memory and said address signals specifying a location in said internal cache memory; and (c) transferring said data signals from said external bus to said internal bus and writing said data signals into said location of said internal cache memory during said write access of said internal cache memory.

9. The method of claim 8, said logic signal being part of a control field, wherein when a predetermined bit pattern is received in said control field, said write access is enabled.

10. A method for reading an internal cache memory of an integrated circuit, said integrated circuit including a central processing unit and coupled to an external memory and an external bus, said external having a portion that is shared by address signals and data signals over a bus cycle of two or more clock periods, said method comprising the steps of:

providing within said integrated circuit an internal bus interfaced to said internal cache memory;

providing within said integrated circuit a read buffer and a write buffer for storing data received from said external memory and data to be stored into said external memory, respectively, said read buffer and said write buffer being coupled to said internal bus and said plurality of terminals during a functional operation not under said test mode; and in response to receiving a command indicating said test mode, (a) stalling said central processing unit and decoupling said read buffer and said write buffer from said internal bus and said plurality of terminals;

(b) receiving into said integrated circuit, from said external bus, a logic signal indicating a read access of said internal cache memory and address signals specifying a location in said internal cache memory; and (c) reading, during said read access of said internal cache memory, stored data from said location of said internal cache memory, providing said stored data on said internal bus, and transferring said stored data as said data signals on said external bus.

11. The method of claim 10, said logic signal being part of a control field, wherein when a predetermined bit pattern is received in said control field, said read access is enabled.

12. The method of claim 10, wherein said stored data include a tag portion and a data portion.

13. The method of claim 10, wherein said internal cache memory comprises an instruction cache and a data cache.

14. The method of claim 10, wherein said internal cache memory has a line size exceeding the width of said external bus, said external bus being time-multiplexed during data transfers between said external bus and said internal bus.

15. The method as in claim 10, wherein each location in said internal cache memory is specified by a predetermined bit pattern of said address signals.

* * * * *